(12) United States Patent
Nelson

(10) Patent No.: US 7,913,713 B2
(45) Date of Patent: Mar. 29, 2011

(54) COMBINATION WET KIT

(75) Inventor: Thomas J. Nelson, St. Anthony, MN (US)

(73) Assignee: Clutch and Transmission Service, Inc., St. Paul, MN (US)

( * ) Notice: Subject to any disclaimer, the term of this patent is extended or adjusted under 35 U.S.C. 154(b) by 855 days.

(21) Appl. No.: 11/645,476

(22) Filed: Dec. 26, 2006

(65) Prior Publication Data

US 2008/0149206 A1 Jun. 26, 2008

(51) Int. Cl.
*B60P 3/40* (2006.01)
(52) U.S. Cl. .................................. 137/354; 137/565.19
(58) Field of Classification Search .................. 137/351, 137/354, 561 R, 565.19, 565.26, 899, 118.06; 280/421; 60/468; 417/302, 303, 308
See application file for complete search history.

(56) References Cited

U.S. PATENT DOCUMENTS

| | | | | |
|---|---|---|---|---|
| 1,863,696 A * | 6/1932 | North et al. | .................... | 414/696 |
| 2,990,785 A * | 7/1961 | Nielsen | .................... | 137/351 |
| 3,181,431 A * | 5/1965 | Hein et al. | .................... | 91/531 |
| 3,403,798 A * | 10/1968 | Flachbarth et al. | ............ | 414/482 |
| 3,977,101 A * | 8/1976 | Ohms | .................... | 37/416 |
| 4,050,596 A * | 9/1977 | Zeuner et al. | .................... | 414/686 |
| 4,138,202 A * | 2/1979 | Eller | .................... | 417/47 |
| 4,415,448 A * | 11/1983 | Lennartz et al. | ............ | 210/333.1 |
| 5,287,939 A | 2/1994 | Fernandez | | |
| 5,542,306 A | 8/1996 | Fernandez | | |
| 6,334,464 B1 * | 1/2002 | LaMotte | .................... | 137/885 |
| 6,634,173 B2 * | 10/2003 | Linster et al. | .................... | 60/484 |
| 6,739,130 B2 | 5/2004 | Prampolini | | |
| 6,837,266 B2 | 1/2005 | Fredrickson et al. | | |
| 7,070,036 B2 | 7/2006 | Fernandez | | |
| 2004/0055290 A1 * | 3/2004 | Duprey | .................... | 60/468 |

OTHER PUBLICATIONS

Muncie Power Products, Combo Kit II Complete Hydraulic System, www.munciepower.com.
PERMCO, Gemini Heavy Duty Pump For Live Floors, Moving Floors, and Dump Trailers, www.permco.com.

* cited by examiner

*Primary Examiner* — John Rivell
*Assistant Examiner* — Kevin Murphy
(74) *Attorney, Agent, or Firm* — Shewchuk IP Services, LLC; Jeffrey D. Shewchuk (57) ABSTRACT

A combination wet kit includes a single mounting bracket supporting an end dump/return manifold and a walking floor/side dump/low boy manifold, as well as a support bracket for the hydraulic fluid filter. A three-way valve is positioned between the end dump/return manifold and a walking floor/side dump/low boy manifold. The manifold unit attached to the tractor without requiring holes in the tractor frame. The manifolds and the preassembled nature of the manifold assembly greatly simplify and reduce costs for installation of the combination wet kit.

20 Claims, 8 Drawing Sheets

COMBINATION WET KIT

CROSS-REFERENCE TO RELATED APPLICATION(S)

None.

FIELD OF THE INVENTION

The present invention relates to hydraulic systems used on trucks or similar vehicles. More particularly, the present invention relates to hydraulic systems used to deliver hydraulic fluid at two or more different pressures, sometimes referred to as combination wet kit installations, such as used in tractor/trailers or trucks known as end dumps, side dumps, walking floors, low boys or similar vehicles.

BACKGROUND OF THE INVENTION

Historically many types of trucks have used hydraulic pressure to power the towed trailer. For instance, the construction business has long used a type of dump trailer, commonly called an "end dump", to haul gravel from one location and dump the gravel at the destination. The end dump trailer is typically pulled by a Class 8 on-highway tractor. Power to operate the hydraulic pump for the hydraulic fluid is generated by a power take off ("PTO") on the tractor, and the cylinder used for dumping the load is commonly mounted on the trailer. The operating pressure of a telescopic cylinder on a typical end dump is 2100 PSI max, with 30 gallons per minute of nominal flow of the hydraulic fluid. This type of end dump requires a 3-way directional valve mounted on the tractor to raise and lower the telescopic cylinder. In the most common arrangement for connecting the cylinder on the trailer to the 3-way directional valve, a single hydraulic line attached integrally to the hydraulic oil pump is used.

In the past couple of decades, other hydraulically powered trailers have become common. For instance, a trailer known as a "walking floor trailer" has become common for hauling bulk commodities such as garbage, wood chips, sawdust and grain. A common walking floor trailer requires up to 2800 PSI hydraulic operating pressures at a nominal flow of 30 gallows per minute to move the floor with heavy loads. No directional valve is typically mounted on the tractor used for the walking floor trailer, as the operational valving is typically located on the trailer. Two lines, a high pressure line and a return line, are required to connect the PTO driven hydraulic fluid from the tractor to the trailer. The PTO, hydraulic pump, reservoir and associated piping or tubing mounted on the tractor to hydraulically power the trailer has become commonly called a "wet kit".

When walking floor trailers started becoming popular, fleet owners wanted the flexibility to pull both end dump trailers and walking floor trailers. This gave the fleet owner more revenue options. Combination wet kits were assembled in-situ and mounted on the tractor. Such combination wet kits might include a 4-way directional valve mounted on the tractor, with 2800 PSI of hydraulic fluid pressure available on one port of the directional valve and with a work port relief mounted on another port of the directional valve to limit the working pressure for end dump trailer use.

Another type of hydraulically powered trailer has also become popular with construction companies. A trailer known as a "side dump" trailer includes a payload that dumps by rotating the box about a longitudinal axis to dump the load to the side of the trailer. Side dump trailers use about the same hydraulic flow rate (25-30 GPM) as end dump and walking floor trailers, but require an intermediate pressure of about 2500 PSI.

Hydraulic packages were further modified to include sufficient pressure relief valving and appropriate output ports, connected as add-ons to the existing systems. The cost of all the various valves and piping needed together with its piece-by-piece assembly on the tractor has become time consuming and expensive. Each package is essentially a custom job of ordering or stocking the various parts, connections and fittings, and then a custom plumbing job of assembling the combination wet kit piece by piece on the tractor. Additionally, the multiple fitting connections became potential leak points for hydraulic fluid during the years of duty and wear to which the hydraulic system would be subjected.

One solution to combo wet kits utilizes a single high pressure connection for all types of trailers. However, the telescopic cylinders on most end dump trailers are only rated at pressures up to 2100 PSI on a continuous basis with a maximum pressure rating of 2500 PSI. Exceeding rated continuous and maximum pressures has the potential to fatigue the cylinder retaining rings and cause the cylinder stages to separate, usually when fully extended. Such a catastrophic failure causes the cylinder pieces, the dump box and the load to come crashing down, with severe risk to life and limb of anyone in the vehicle or its vicinity. Better solutions are needed.

SUMMARY OF THE INVENTION

The invention is a wet kit which permits substantial pre-assembly rather than piece-by-piece in-situ assembly. In one aspect, the substantial pre-assembly is provided by one or more dedicated rigid manifolds providing the end dump port, rather than a piece-by-piece field assembly. The rigid manifold includes a first pressure inlet port, a first pressure outlet port and a second outlet port, with an operatively connected pressure relief valve. A mounting bracket is then used for connecting the rigid manifold with the pressure relief valve to a frame of a vehicle, simplifying the assembly performed in-situ. In another aspect, a single bracket holds an assembly including a high pressure output port for a walking floor or side dump trailer, a return port for the walking floor or side dump trailer, and a mid pressure output port for an end dump trailer. In a further embodiment, the high pressure output can be bled to a reduced flow rate for a low boy trailer, again all supported by the single bracket.

While the above-identified disclosure and drawing figures set forth preferred embodiments, numerous other embodiments of the present invention are also contemplated, some of which are noted in the following description. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

As shown in FIGS. 1-4, a wet kit 10 in accordance with the present invention includes a preassembled manifold unit 12 which is attachable to the frame 14 of an appropriate towing vehicle, such as a class 8 on-highway tractor 16. The wet kit 10 is powered by a power take off ("PTO") unit 18, which is mounted typically to the bottom of the transmission casing (not shown) or otherwise off the drive train 20 (partially shown in FIG. 2) so the tractor's engine ultimately powers a hydraulic pump 22 with integral three-way directional valve 38 and pressures the wet kit 10. For instance, appropriate PTOs 18 are commercially available from Muncie Power Products, Inc. of Muncie, Ind. within the TG series or the CS series (1¼-14 spline 135-150%), and/or as described in one or more of U.S. Pat. Nos. 5,287,939, 5,542,306, 6,739,130 and 7,070,036, incorporated by reference.

Figure 1:
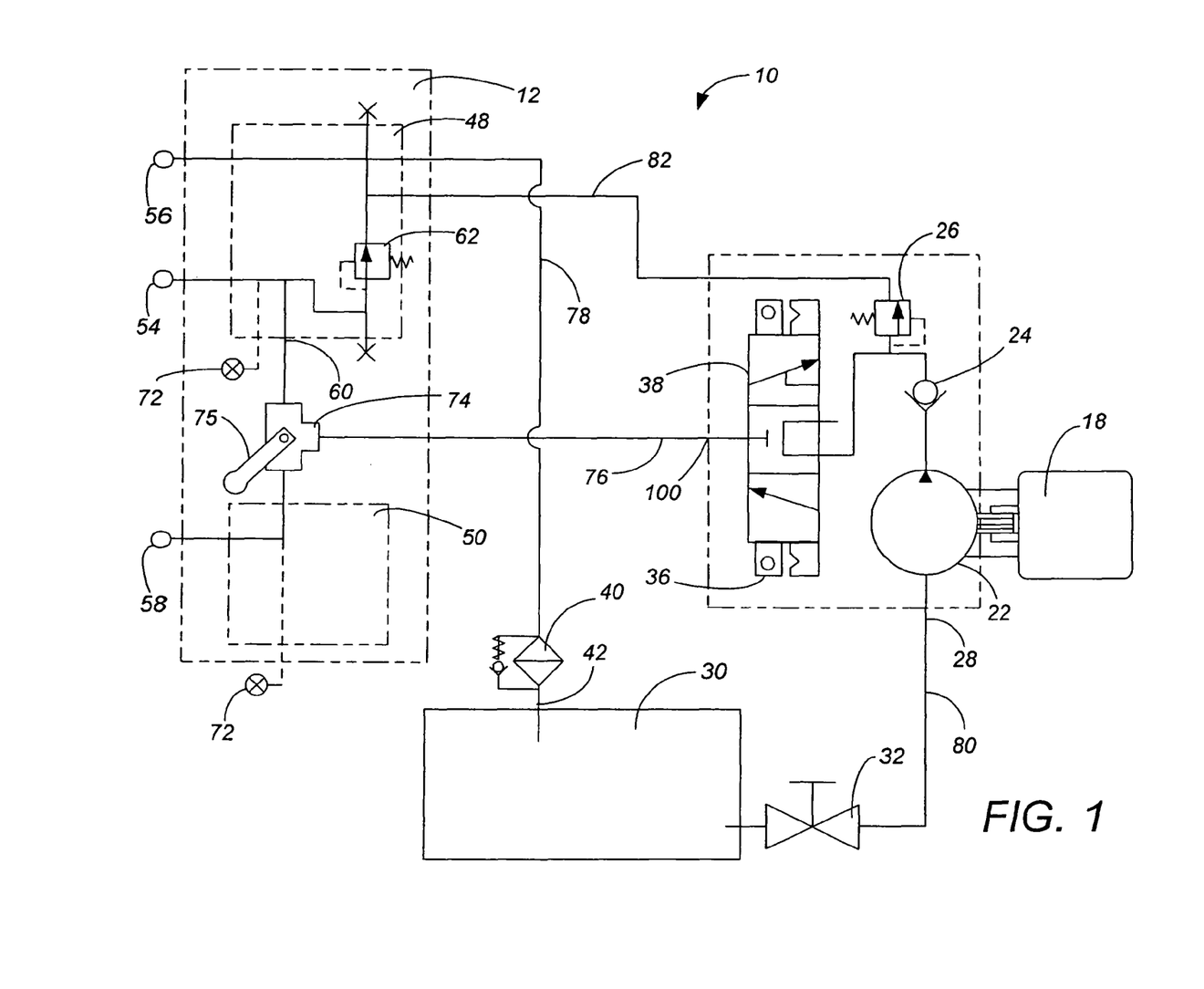
FIG. 1 is a hydraulic schematic of a preferred combination wet kit in accordance with the present invention.

As known in the art, a dump pump 22 for the wet kit 10 can be directly mounted to the PTO 18 and/or further mounted with one or more support brackets (not shown). For instance, appropriate dump pumps 22 are commercially available from Clutch and Transmission Service, Inc. of St. Paul, Minn. or from Permco, Inc. of Streetsboro, Ohio, generally matching the PTO 18 and volume/pressure usage requirements. The preferred dump pump 22 is a high pressure unit delivering up to 2800 PSI or more. As depicted in FIG. 1, a check valve 24 and relief valve 26 may be provided as part of the dump pump 22 to ensure proper pressure and directional flow of the output high pressure oil. A 1¼-14 spline heavy duty shaft can be used for long spline life. In the preferred embodiment, the dump pump 22 is preattached to the PTO 18, and then the PTO/dump pump combination is mounted relative to the transmission/drive shaft of the tractor 16. One or more additional mounting brackets (not shown) may be used to support the PTO/dump pump combination relative to the transmission of the tractor 16.

The dump pump 22 should have one or more inlets 28 for connection to a hydraulic fluid reservoir tank 30, which may include a shut-off valve 32 (shown schematically in FIG. 1). Appropriate hydraulic fluid reservoirs 30 can be either plastic, aluminum or steel, such as in either 50 or 55 gallon sizes. A preferred shut-off valve 32 is a 1.5 inch hydraulic ball valve commercially available from Buyers Product Co. of Mentor, Ohio. The hydraulic fluid reservoir 30 can be mounted at any convenient location on the tractor 16, such as behind the cab 34.

An air shift kit 36 may be used for the dump pump 22, preferably with a three position output valve 38 to permit directional power flow from the dump pump 22 and relief flow back to the reservoir 30 through the dump pump 22. With the air shift kit 36, the operator can control all hydraulically powered trailer functions from inside the cab 34 with air controls. Suitable air shift consoles 36 are commercially available from Muncie Power Products, Inc. of Muncie, Ind.

A filter 40 may be included, preferably on the return line 42 to the reservoir 30. Appropriate medium pressure hydraulic oil filters 40 are commercially available from Donaldson Co. of Bloomington, Minn. The filter 40 should be mounted in a readily accessible location on the tractor 16 to permit changing and replacement of the spin-on filter element 44 at appropriate intervals. Accordingly, the preferred embodiment includes a filter support bracket 46 to cantilever the oil filter 40 to an accessible position. In contrast to the filter 40, it is generally preferable to mount the PTO 18, dump pump 22 and reservoir 30 directly to the tractor 16 (i.e., custom in-situ field mounting) rather than provide them as part of the manifold assembly 12 or supported from the manifold assembly 12.

A hydraulic fluid is selected as the working fluid for the wet kit 10. For instance, the preferred wet kit 10 uses AW32 hydraulic fluid with a −50 F pour point, or a DTE-13 hydraulic fluid with a −50 F pour point for cold or winter climates. The preferred system 10 has a hydraulic fluid capacity of about 60 gallons.

The preferred manifold assembly 12 includes two manifold blocks 48, 50 bolted to a mounting bracket 52. The manifold blocks 48, 50 may be machined from aluminum, while the mounting bracket 52 can be machined from steel plate stock such as at ¼ inch thickness. While the manifold assembly 12 could alternative have a single manifold block, the preferred manifold assembly 12 includes an end dump/return block 48 which is separate from a walking floor/side dump/low boy manifold block 50 ("WF/SD/LB block 50"). The end dump/return block 48 has an end dump connection 54 and a return connection 56. The WF/SD/LB block 50 provides the connection 58 for the walking floor or side dump or low boy trailer.

The rigid manifold of the end dump/return block 48 provides a first high pressure inlet port 60, a reduced or mid-pressure (2100 PSI) outlet port 54 and a return port 56. The rigid manifold 48 also receives and supports a pressure relief valve 62, operatively connected between the first high pressure inlet port 60, the reduced pressure outlet port 54 and the return port 56, to lower the high pressure of the dump pump 22 to a proper level for the end dump telescoping cylinders 64 (shown schematically in FIG. 5). The manifold block 48 significantly reduces the number of connections, number of parts and assembly time required as compared to connecting individual valves and outputs piece-by-piece to the tractor 16 in the field.

Figure 2:
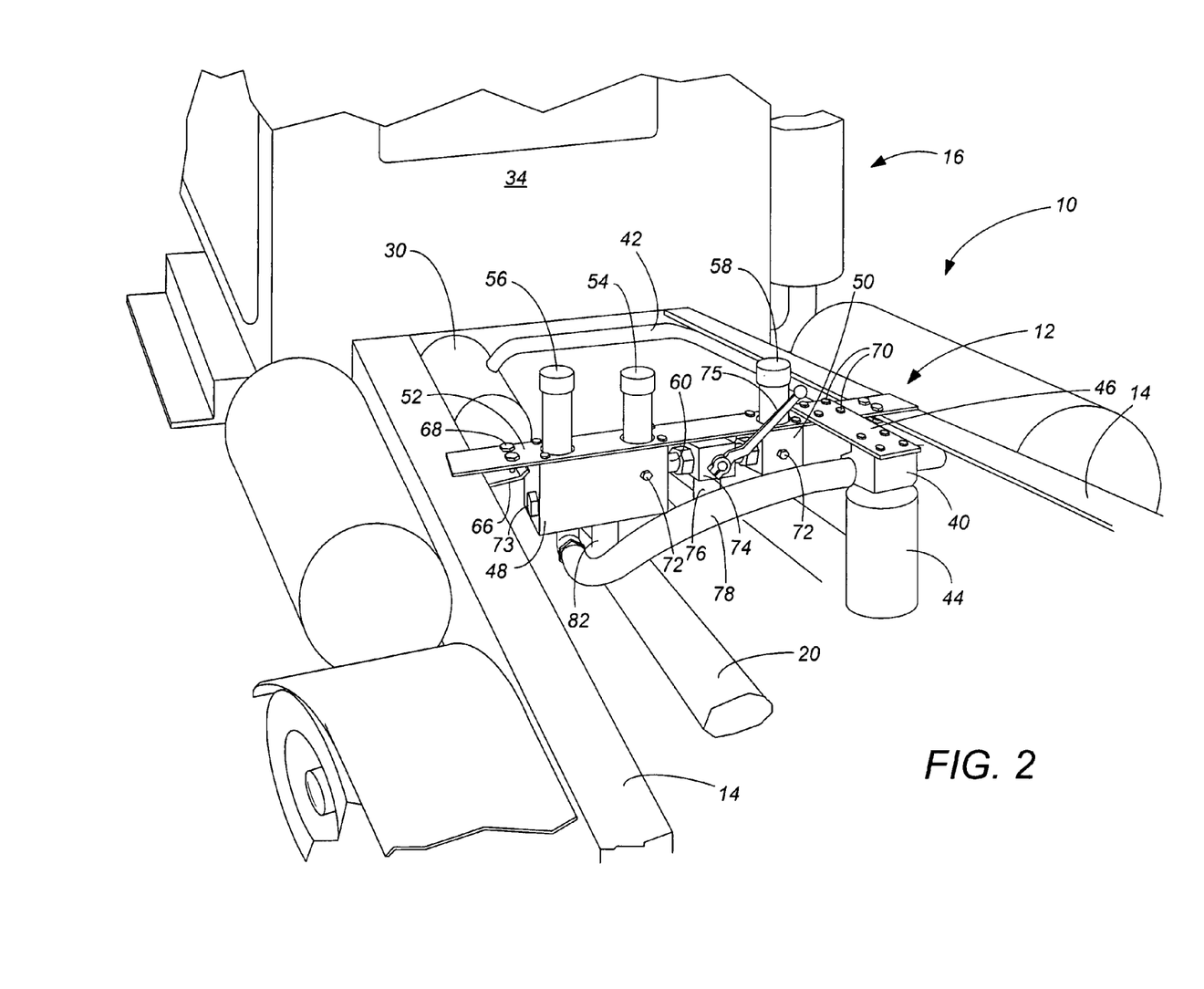
FIG. 2 is a perspective view of the combination wet kit of FIG. 1 mounted on a tractor.
Figure 3:
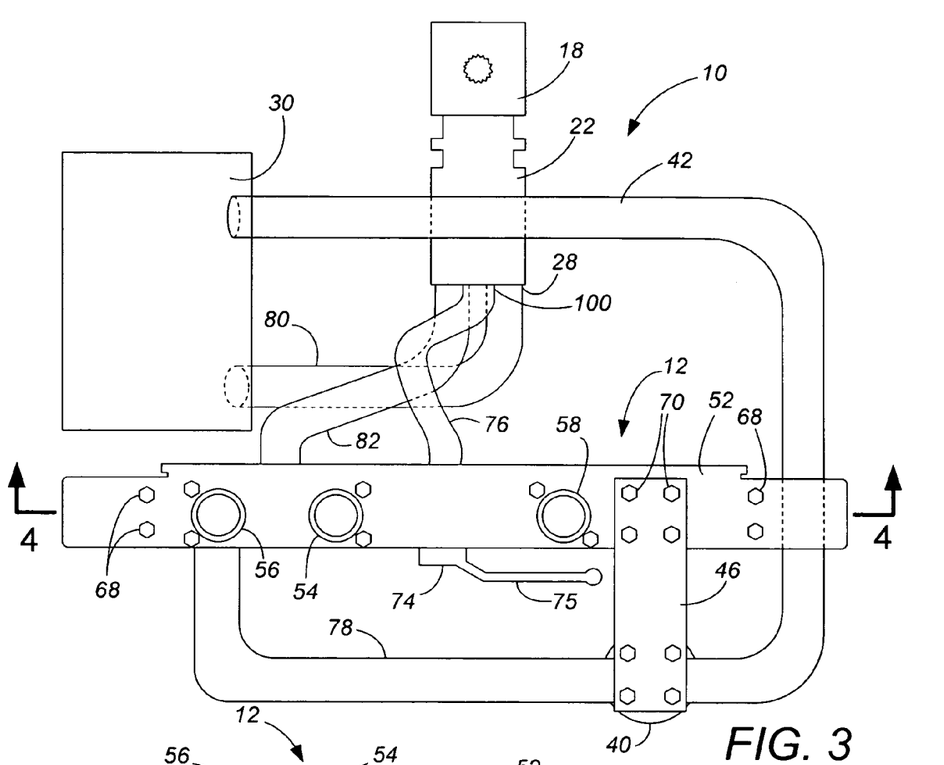
FIG. 3 is a top view of the combination wet kit of FIGS. 1 and 2.
Figure 4:
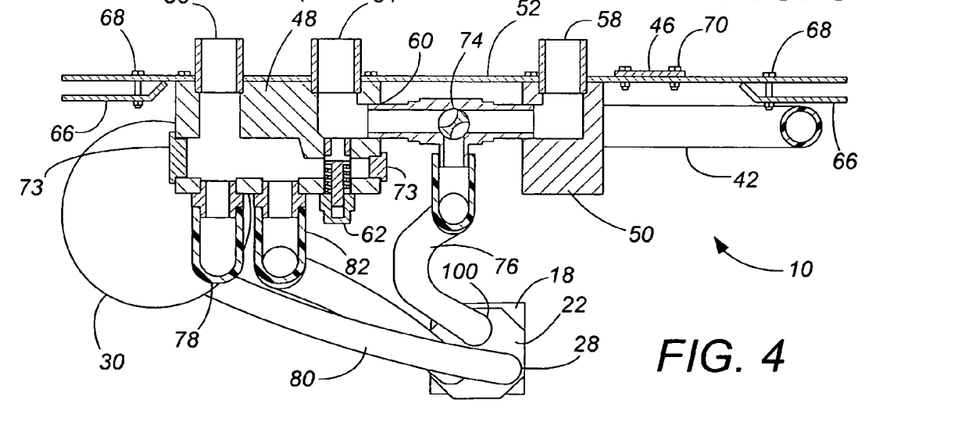
FIG. 4 is a cross-sectional side view of the combination wet kit, taken along lines 4-4 of FIG. 3.

As best shown in FIGS. 2-4, the manifold mounting bracket 52 is connectable to the frame 14 of the tractor 16 with mounting clips 66. Each mounting clip 66 is attached to an end of the mounting bracket 52 with bolts 68. When the bolts 68 are tightened, each mounting clip 66 due to its bend biases toward the mounting bracket 52 to hold the mounting bracket 52 to the vehicle frame 14, maintaining a secure connection over miles of highway vibration and use. By using mounting clips 66 rather than a bolt attachment to the frame 14 of the tractor 16, the wet kit 10 is not particular to pre-existing bolt hole locations on the frame 14 of the tractor 16, and installation of the wet kit 10 does not require any drilling through the frame 14 of the tractor 16.

The manifold mounting bracket 52 and the filter mounting bracket 46 include appropriately positioned connection bolt holes and bolts 70. With these connection bolt holes and bolts 70, the filter 40 and filter mounting bracket 46 can be preassembled onto the manifold mounting bracket 52, and the return line 78 from the ED/return block 48 to the filter 40 can be attached and tightened prior to attaching the assembly to the tractor 16.

Gauge ports 72 are machined into each manifold block 48, 50. The gauge ports 72 are useful to verify the pressure being generated in the hydraulic fluid and to double check the pressure settings on the relief valves 26, 62. During use of the wet kit 10, the gauge ports 72 are preferably plugged such as with the plugs shown. Additional plugs 73 may be included on the manifold blocks 48, 50 for machining openings cut to allow machining access to the interior of each block 48, 50.

The relief valve 26 on the dump pump 22 determines the output pressure in the high pressure line 76 and at the high pressure port 58 (WF/SD/LB port 58, typically set at 2500-2800 PSI). The relief valve 62 on the ED/return block 48 determines the output pressure at the mid-pressure port 54 (end dump floor port 54, typically set at 2100 PSI). In each of these relief valves 26, 62, if the upstream pressure gets too high, the relief valve 26, 62 opens to maintain/reduce the upstream pressure at or down to the set value. Suitable relief valves 26, 62 can be direct acting internal drain pressure relief cartridge valves commercially available from Sun Hydraulics, Inc. of Sarasota, Fla.

A three-way valve 74 such as a ball valve is positioned between the end dump/return block 48 and the WF/SD/LB block 50 receiving the high pressure line 76. Suitable high pressure ball valves 74 are commercially available such as from Dynamic Fluid Components Inc. of West Union, S.C. The three-way valve 74 could alternatively be positioned inside either the end dump/return manifold block 48 or the WF/SD/LB manifold block 50. Either way, the combination of the three components (end dump/return block 48, the WF/SD/LB block 50, and the three-way valve 74) can be pre-assembled and mounted to the mounting bracket 52 in a controlled environment (on the benchtop, or in an assembly line of a factory) rather than assembled directly on the vehicle 16. The three-way valve 74 is preferably fitted with a large handle 75, so the operator can readily access the handle 75 and can easily generate the torque for switching the valve 74 when changing trailers 84, 86, 88, 90.

Appropriate hydraulic lines 76, 78, 42, 80, 82 are used to connect the dump pump 22 to the manifold assembly 12, the manifold assembly 12 to the filter 40, the filter 40 to the reservoir 30, and the reservoir 30 to the dump pump 22, and the output of dump pump relief valve 26 to the manifold assembly 12. In this regard, it should be noted that the pressure relief line 82 from the dump pump 22 need not be connected to the end dump/return manifold 48, but rather could be separately connected to the filter 40 or otherwise back to the dump pump inlet 28. However, the end dump/return manifold 48 provides a convenient midpoint location for the pressure relief line 82 on the route from the dump pump 22 to the filter 40, so a simpler, more direct connection can be made during the in-situ portion of the assembly. In the preferred embodiment and for best performance, a 1 inch pressure line 76 rated at least 3000 PSI are used to transfer high pressure fluid from the dump pump 22 to the manifold assembly 12. For the lower pressure return lines 78, 42, 78, 80, 1¼ inch or 1½ inch suction lines can be used.

As shown in FIGS. 5-13, the combination wet kit 10 of the present invention is intended to permit use with different trailers 84, 86, 88, 90, and the hydraulic lines 92, 94, 96 between the tractor 16 and each trailer 84, 86, 88, 90 should be readily detachable to facilitate changing of trailers 84, 86, 88, 90. For instance, the output/return ports 54, 56, 58 and the hydraulic lines 92, 94, 96 between the tractor 16 and the trailer 84, 86, 88, 90 may incorporate quick disconnect couplings (not separately shown). Suitable quick disconnect couplings are commercially sold by Safeway Hydraulics, Inc. of Chaska, Minn., by Eaton's Aeroquip Group of Maumee, Ohio, by Faster Inc. of Maumee, Ohio, by the Quick Coupling Division of Parker Hannifin Co. of Minneapolis, Minn., and by the Quick Disconnect and Valve Division of Snap-tite Inc. of Erie, Pa. The preferred quick disconnect couplings are double shut-off to minimize the loss of hydraulic fluid.

The three output/return connections 54, 56, 58 from the manifold unit 12 are preferably unique (i.e., different from each other) to make it more difficult for the operator to misconnect trailers to incorrect ports. The unique output/return connections 54, 56, 58 thus result in safer operation, reducing the possibility of end dump cylinder separations from overpressurizing telescopic cylinders 64. The hose connections should be clearly marked on the mounting bracket 52 to further facilitate connections to the trailer 84, 86, 88, 90.

Figure 5:
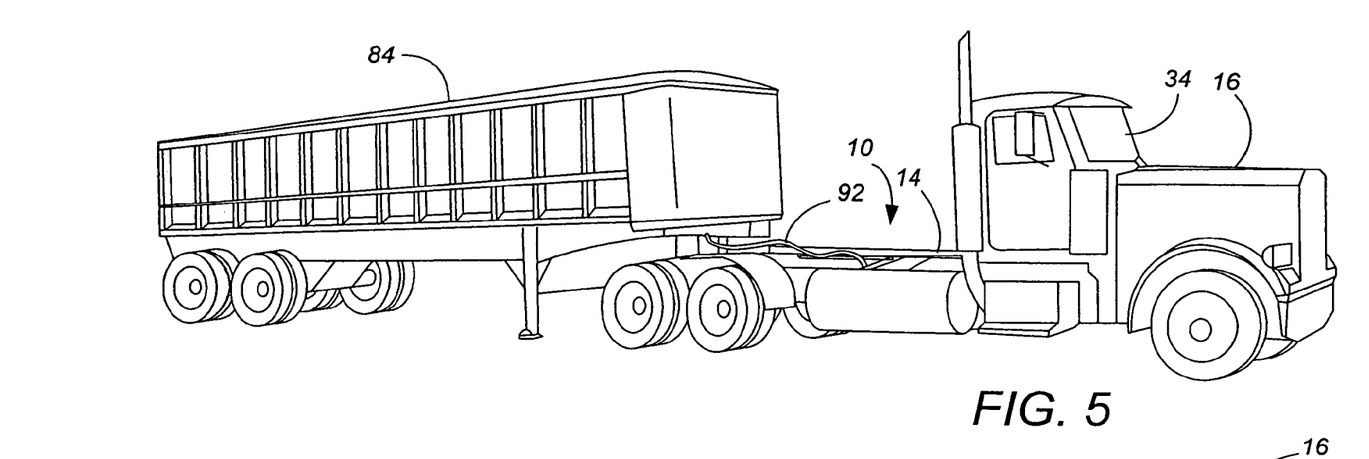
FIG. 5 is a perspective view of the tractor of FIG. 2 powering an end dump trailer.
Figure 6:
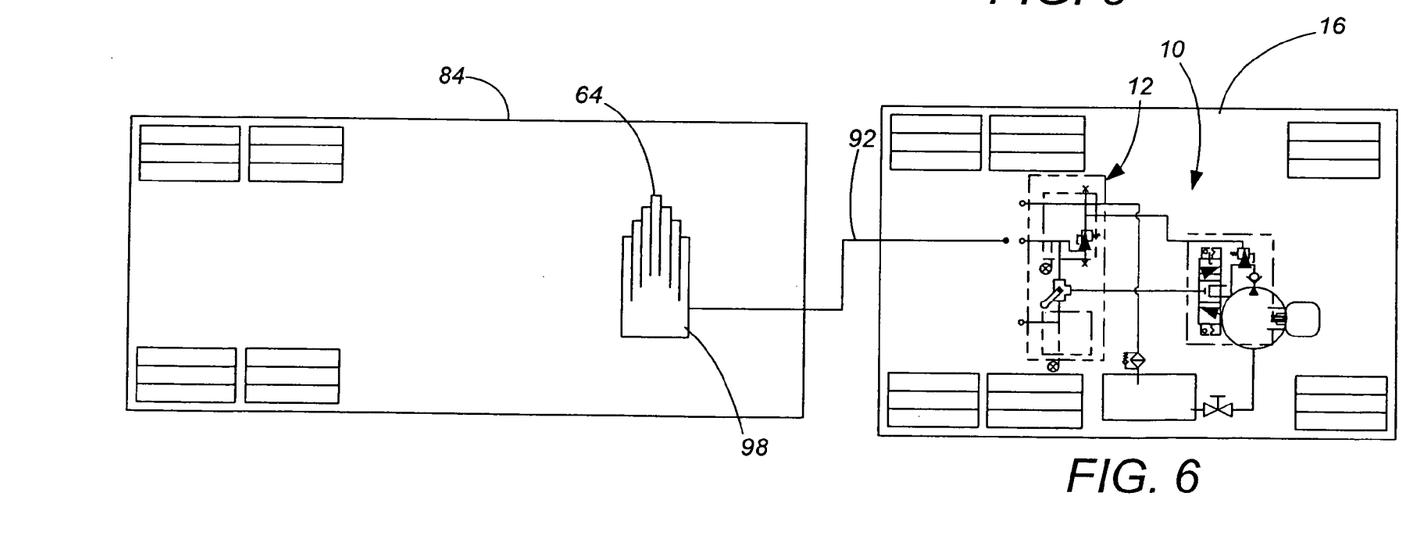
FIG. 6 is a hydraulic schematic of the tractor with combination wet kit and end dump trailer of FIG. 5.

FIGS. 5 and 6 depict the use of the combination wet kit 10 of the present invention with an end dump trailer 84. For end dump use, a single end dump hose 92 is connected to the ED outlet 54, to receive hydraulic fluid at 2100 PSI. Control valving 98 for raising and lowering the telescoping cylinders 64 are on the trailer 84, and the return outlet 56 and the WF/SD/LB outlet 58 are not used. Even if the combination wet kit 10 is only used for end dump trailer(s) 84, it still provides advantages over the prior art. In particular, assembly of the combination wet kit 10 onto the tractor 16 only requires mounting of the three pieces (PTO/dump pump combination, reservoir 30 and manifold unit 12 with filter 40) onto the tractor 16, and then connection of the four lines (line 42 from filter 40 to reservoir 30, line 80 from reservoir 30 to dump pump 22, dump pump relief line 82 to ED/return manifold 48, and high pressure line 76 from dump pump output 100 to three-way valve 74). The simplest and speediest possible assembly time on the tractor 16 is achieved, minimizing the out-of-service down-time for the tractor 16. Because much of the assembly is accomplished on the bench or factory floor rather than on the tractor 16 or in the field, assembly time is quicker, and less expensive assembly line procedures and employees can be used. Pre-assembly minimizes the number of parts, such as junctions and tees, which are required when the tractor 16 is present, minimizing the possibility of a wet kit assembly being derailed while waiting for one missing part.

Figure 7:
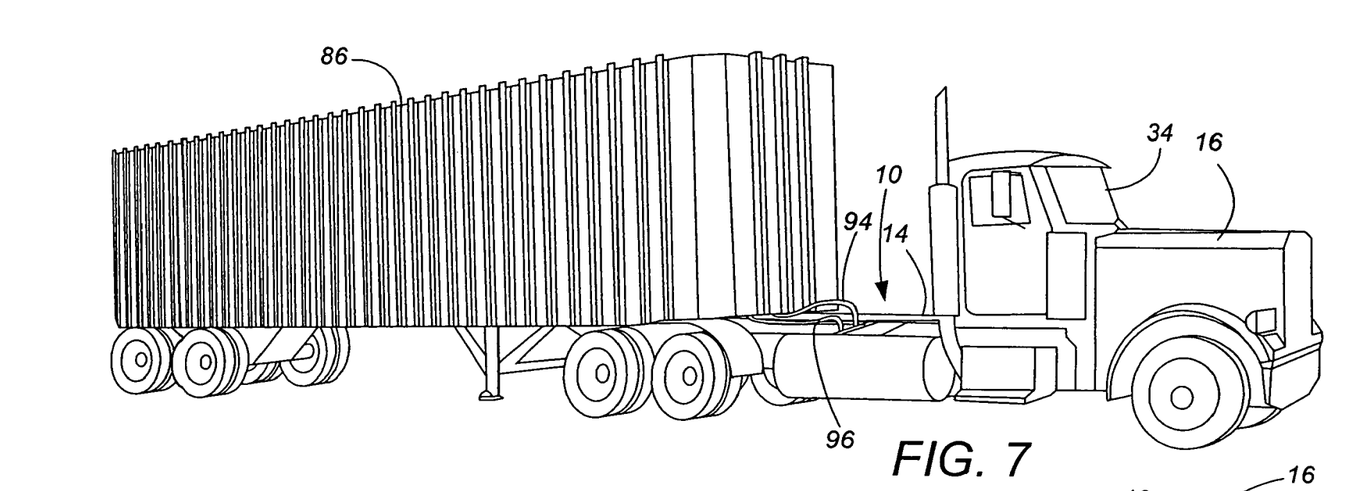
FIG. 7 is a perspective view of the tractor of FIG. 2 powering a walking floor trailer.
Figure 8:
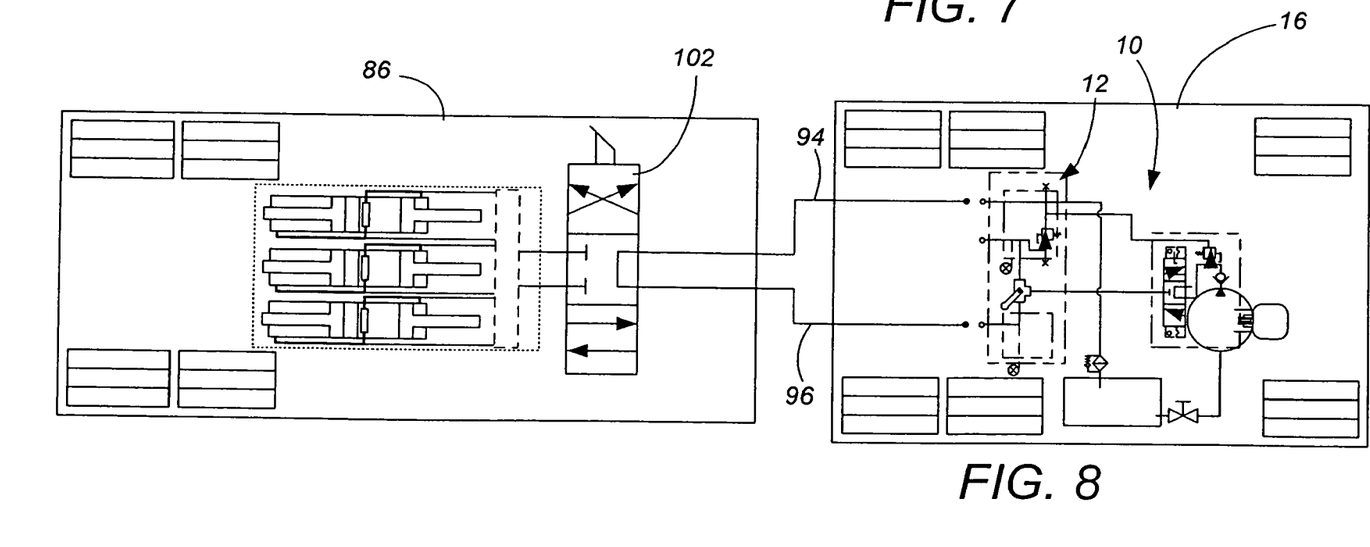
FIG. 8 is a hydraulic schematic of the tractor with combination wet kit and walking floor trailer of FIG. 7.

FIGS. 7 and 8 depict use of the combination wet kit 10 of the present invention with a walking floor trailer 86. For walking floor use, one pressure supply hose 96 is connected to the WF/SD/LB outlet 58, to receive hydraulic fluid at 2500-2800 PSI. A return hose 94 is connected from the return on the trailer 86 to the return port 56 on the manifold unit 12. A three-position extend/retract control valve 102 on the trailer 86 then governs control of the walking floor.

Figure 9:
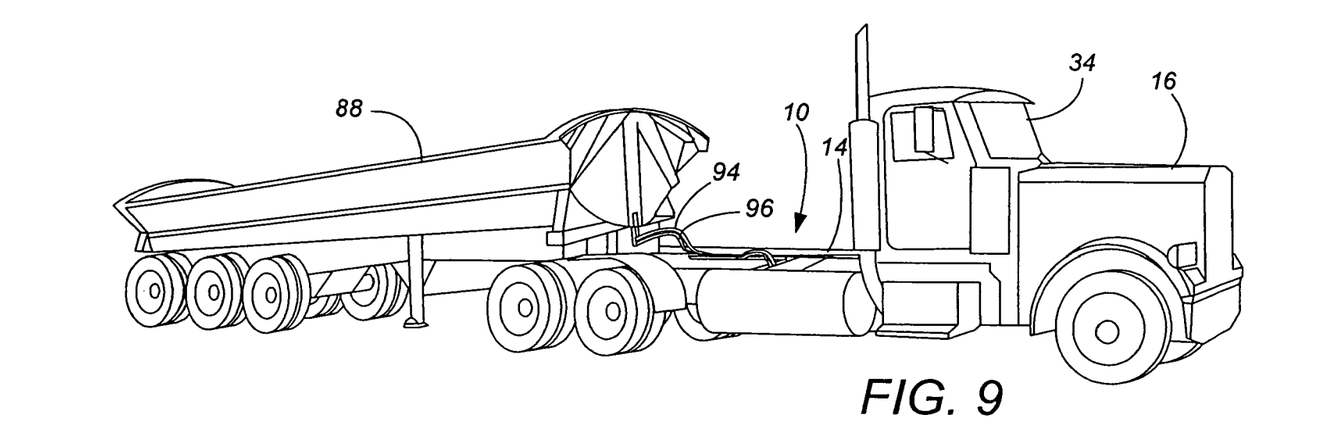
FIG. 9 is a perspective view of the tractor of FIG. 2 powering a side dump trailer.
Figure 10:
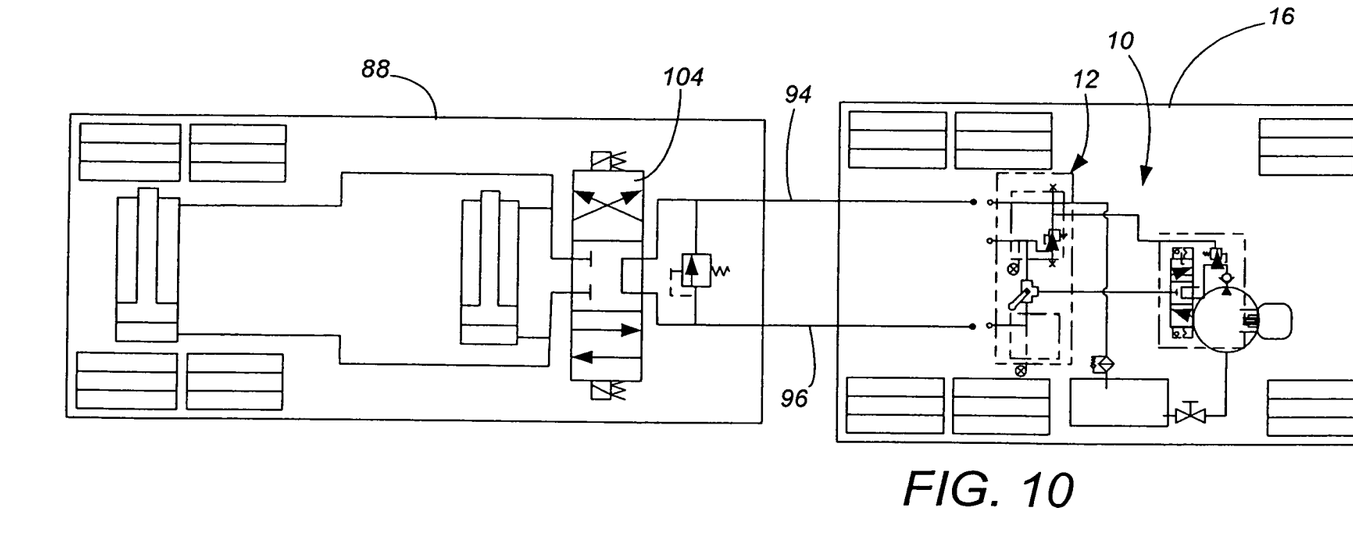
FIG. 10 is a hydraulic schematic of the tractor with combination wet kit and side dump trailer of FIG. 9.

FIGS. 9 and 10 depict use of the combination wet kit 10 of the present invention with a side dump trailer 88. The hydraulic connections to the trailer 88 are the same as for the walking floor 86: a pressure supply hose 96 is connected to the WF/SD/LB outlet port 58, and a return hose 94 is connected from the return on the trailer 88 to the return port 56 on the manifold unit 12. A dump control valve 104 on the trailer 88 then governs dumping of the side dump 88. The present invention thus provides a manifold unit 12 which is flexible for three uses (end dump 84, walking floor 86 and side dump 88), which is substantially preassembled, simpler and more easily mounted than prior art field assemblies.

Figure 11:
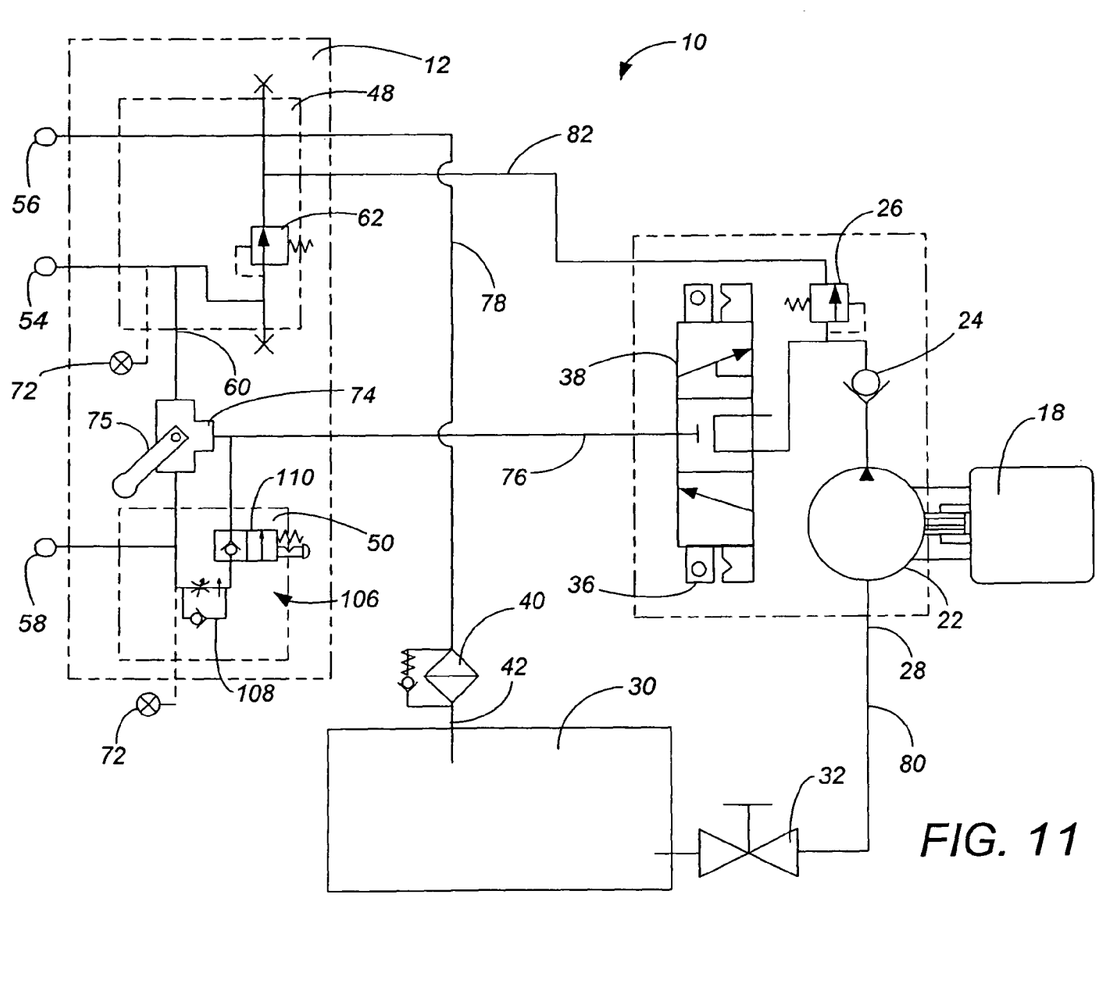
FIG. 11 is a hydraulic schematic of an alternative embodiment of the combination wet kit utilizing low boy bleed off valving.
Figure 12:
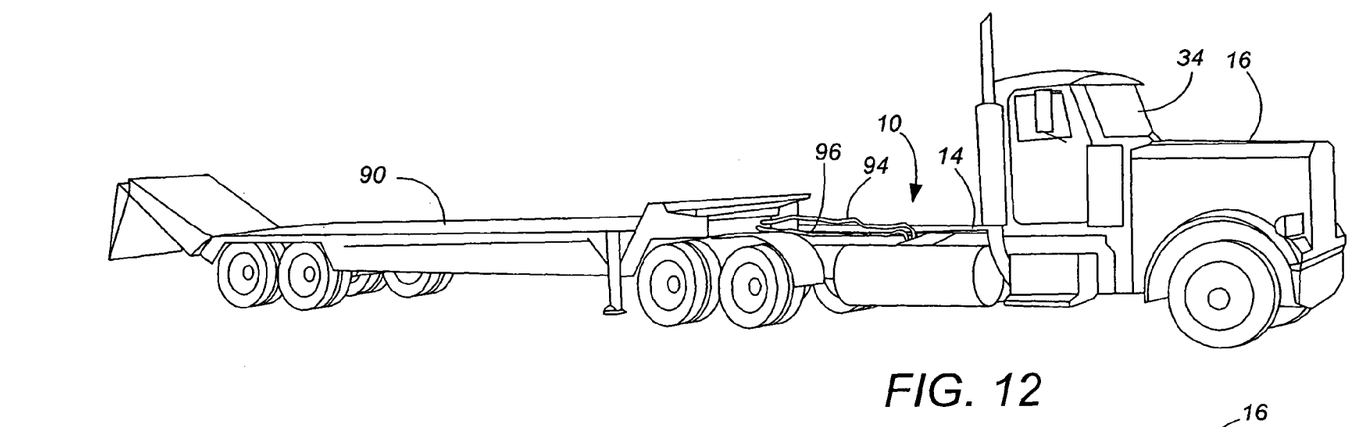
FIG. 12 is a perspective view of a tractor powering a low boy trailer using the combination wet kit of FIG. 11.
Figure 13:
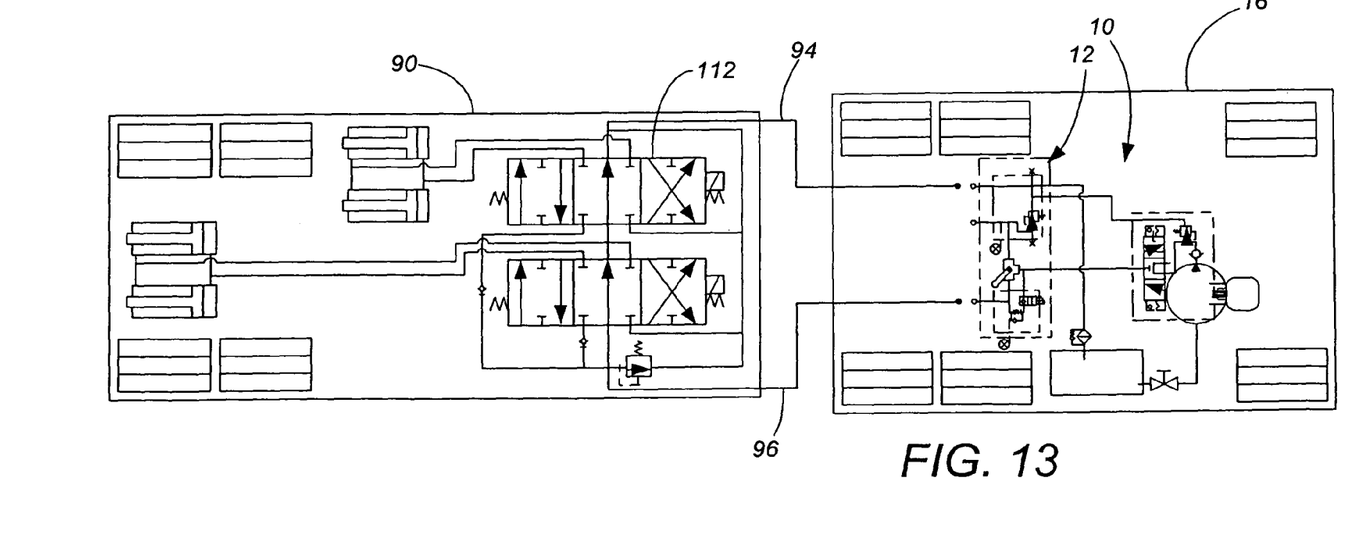
FIG. 13 is a hydraulic schematic of the tractor with combination wet kit and low boy trailer of FIG. 12.

The wet kit 10 of the present invention may further include a simple modification for operation of "Low Boy" type trailers 90, as shown in FIGS. 11-13. Low Boy type trailers 90 typically only need about 10 to 12 GPM of hydraulic fluid flow to operate the trailer 90 at an acceptable speed. The minimum flow generated in most PTO/dump pump arrangements is about 20 GPM. To lower the flow rate to an acceptable Low Boy speed, a bleed off circuit 106 is added to the WF/SD/LB block 50. The bleed off circuit 106 includes a flow control valve 108 and a bleed valve (pressure compensated flow control) 110. The preferred flow control valve 108 is an adjustable orifice restrictive flow regulator, such as those commercially available in the FR12 series from HydraForce, Inc. of Lincolnshire, Ill. To check the low flow function for Low Boy operation, the handle 75 for the ball valve 74 is moved to the walking floor/side dump position. The flow valve 108 is opened by rotating the button 90 degrees to the outer pin catch, and the bleed valve 110 is adjusted on the bottom of the small block until the desired travel speed for the Low Boy operation is achieved. When the correct bleed flow to slow down the trailer functions is achieved, the bleed valve 110 is locked in place by using a jam nut under the flow control knob.

To operate the selected trailer 84, 86, 88, 90 with the wet kit 10 of the present invention, first the hoses 92, 94, 96 for the trailer 84, 86, 88, 90 are connected to the ports 54, 56, 58 with the PTO 18 disengaged. With the trailer hoses 92, 94, 96 connected to the appropriate output ports 54, 56, 58, the clutch is slowly released to engage the PTO 18. The various control valving 98, 102, 104, 112 is then used to control trailer operation.

The wet kit 10 of the present invention has several distinct features that provide better operation and/or reduced cost. For the first time in the industry, the combination wet kit 10 is a standard unit easily mountable to the frame 14 of the tractor 16 rather than a custom in-situ assembly on the tractor 16. The manifold unit 12 can be pre-assembled in a controlled environment (i.e., indoors, on the benchtop) and outside the presence of the tractor 16. With such preassembly, the connections can be made more accurately and properly tightened and sealed, avoiding or at least minimizing the possibility of a leak developing in use of the system 10. Preassembly of the manifold unit 12 minimizes the duration that the tractor 16 is out of service during installation of the wet kit 10. Preassembled manifold units 12 can also be shipped preassembled, permitting much easier in-the-field installation of the wet kit 10.

The filter 40 can be included as part of the pre-assembly, and/or mounted from the same support bracket 52 that is used for mounting the manifold unit 12. This allows the filter 40 to be more easily mounted to the tractor 16, and further places the filter 40 in an exposed position for easy changing of the filter element 44.

The wet kit 10 provides dual pressure connections for 2100 PSI end dumps 84 and 2500-2800 PSI walking floors 86 and side dumps 88. The modified embodiment further permits a 2500-2800 PSI connection with reduced flow for powering low boy trailers 90. All of this flexibility is achieved with a simple and clean installation.

Although the present invention has been described with reference to preferred embodiments, workers skilled in the art will recognize that changes may be made in form and detail without departing from the spirit and scope of the invention.

The invention claimed is:

1. A hydraulic fluid assembly in a wet kit mountable to a tractor for providing hydraulic power to a detachable trailer, comprising:
   a rigid manifold having a first pressure inlet port, a first pressure outlet port and a second outlet port;
   a pressure relief valve operatively connected between the first pressure inlet port, the first pressure outlet port and the second outlet port, the pressure relief valve limiting pressure at the first pressure outlet port below a threshold level, such that hydraulic fluid traveling through the rigid manifold from the first pressure inlet port to the first pressure outlet port can provide hydraulic power from the tractor to power a hydraulic cylinder on the detachable trailer at a pressure below the threshold level;
   a mounting bracket for connecting the rigid manifold with the pressure relief valve to a frame of the tractor, for on-highway travel at highway speeds with the tractor; and
   a three way valve having an inlet, a first outlet and a second outlet, with a flow blockage member moveable to allow or prevent hydraulic fluid flow from the inlet to the first outlet and from the inlet to the second outlet, with the three way valve attached relative to the mounting bracket for attachment to the frame of the tractor jointly with the rigid manifold;
   wherein the first pressure outlet port extends on a top side of the mounting bracket, and wherein the inlet of the three way valve extends on a bottom side of the mounting bracket.

2. The hydraulic fluid assembly of claim 1, wherein the rigid manifold further comprises a return inlet port in direct fluid communication with the second outlet port.

3. The hydraulic fluid assembly of claim 1, wherein the rigid manifold further comprises a third outlet port in direct fluid communication with the second outlet port.

4. The hydraulic fluid assembly of claim 1, wherein the rigid manifold further comprises a return inlet port in direct fluid communication with the second outlet port, with the return inlet port extending on a top side of the mounting bracket and the second outlet port extending on a bottom side of the mounting bracket.

5. The hydraulic fluid assembly of claim 1, wherein the mounting is attachable to the frame of the tractor without extending through any holes present or drilled into the frame of the tractor.

6. The hydraulic fluid assembly of claim 1, wherein the rigid manifold comprises a pressure gauge port.

7. The hydraulic fluid assembly of claim 1, wherein the rigid manifold is formed as a single, unitary monolithic manifold block which is fixed to the mounting bracket.

8. The hydraulic fluid assembly of claim 1, wherein the tractor is a class 8 tractor.

9. A wet kit mountable to a tractor for providing hydraulic power to a trailer, comprising:
   a mounting bracket adapted for attachment to a frame of the tractor;
   a first low pressure hydraulic fluid port supported from the mounting bracket; and
   a second low pressure hydraulic fluid port supported from the mounting bracket, the second low pressure hydraulic fluid port being in direct fluid communication with the first low pressure hydraulic fluid port;
   a hydraulic pump for pressuring hydraulic fluid;
   a valve in fluid communication with the hydraulic pump, the valve having a first position directing high pressure hydraulic fluid to a high pressure outlet, the valve having a second position directing high pressure hydraulic fluid to a mid pressure outlet, the mid pressure outlet being piped through a relief valve to the first low pressure hydraulic fluid port, with the valve being supported by the mounting bracket wherein the high pressure outlet and the mid pressure outlet extend on a top side of the mounting bracket, and wherein an inlet of the valve extends on a bottom side of the mounting bracket; and a hydraulic fluid reservoir piped to the first low pressure hydraulic fluid port.

10. The wet kit of claim 9, further comprising a filter in fluid communication between the first low pressure hydraulic fluid port and the hydraulic fluid reservoir, with the filter element being supported by the mounting bracket.

11. The wet kit of claim 9, further comprising a power take off unit powering the hydraulic pump.

12. The wet kit of claim 9, wherein the valve has a handle for moving the valve from the first position to the second position.

13. The wet kit of claim 9, wherein the handle extends above the mounting bracket.

14. The wet kit of claim 9, wherein the hydraulic pump is mounted below the mounting bracket, wherein the high pressure outlet is in direct fluid communication with a high pressure outlet port extending above the mounting bracket, wherein the mid pressure outlet is in direct fluid communication with a mid pressure outlet port extending above the mounting bracket, and wherein the second low pressure hydraulic fluid port extends above the mounting bracket.

15. A method of installing a wet kit to a tractor for providing hydraulic power to a trailer, comprising:

assembling a manifold unit including a three way valve, a high pressure outlet port in direct fluid communication with the three way valve, a pressure relief valve and a mid pressure outlet port in direct fluid communication with the three way valve, and a return port all attached to a mounting bracket;

mounting the assembled manifold unit to a frame of the tractor, such that the high pressure outlet port extends on a top side of the mounting bracket and an inlet of the three way valve extends on a bottom side of the mounting bracket;

connecting a hydraulic fluid line from a dump pump and power take off mounted on the tractor to the inlet of the three way valve of the assembled manifold unit; and connecting a hydraulic fluid line from the assembled manifold unit to a hydraulic fluid reservoir mounted on the tractor.

16. The method of claim 15, wherein the three way valve has a first outlet and a second outlet, with a flow blockage member moveable to allow or prevent hydraulic fluid flow from the inlet to the first outlet and from the inlet to the second outlet, with the three way valve mounted beneath the mounting bracket and with the high pressure outlet port, the mid pressure outlet port and the return port all extending above the mounting bracket.

17. The method of claim 15, wherein the assembled manifold unit is mounted to the frame of the tractor without extending through any holes present or drilled into the frame of the tractor.

18. The method of claim 15, further comprising:

supporting a hydraulic fluid filter from the mounting bracket.

19. The method of claim 15, wherein the tractor is suitable for on-highway travel at highway speeds with the connected assembled manifold unit mounted thereto, to selectively deliver either high pressure hydraulic fluid or mid pressure hydraulic fluid to a detachable trailer for powering a hydraulic cylinder of the detachable trailer.

20. The method of claim 19, wherein the tractor is a class 8 tractor.

* * * * *